(12) United States Patent
McConnell et al.

(10) Patent No.: US 7,517,280 B2
(45) Date of Patent: Apr. 14, 2009

(54) AIR DUCT ASSEMBLY FOR A VEHICLE

(75) Inventors: Robert A. McConnell, Canton, MI (US); Stefan Young, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/671,108

(22) Filed: Feb. 5, 2007

(65) Prior Publication Data

US 2007/0184772 A1    Aug. 9, 2007

Related U.S. Application Data

(60) Provisional application No. 60/765,969, filed on Feb. 7, 2006.

(51) Int. Cl.
*B60H 1/26* (2006.01)
*B60H 1/24* (2006.01)
*F24F 7/00* (2006.01)

(52) U.S. Cl. ............... 454/162; 454/164; 137/512.1; 137/855

(58) Field of Classification Search .......... 454/69, 454/139, 162, 163, 164, 165; 137/512.1, 137/855
See application file for complete search history.

(56) References Cited

U.S. PATENT DOCUMENTS

| | | | |
|---|---|---|---|
| 1,223,903 A | | 4/1917 | Pickens |
| 3,405,968 A | * | 10/1968 | Feles et al. ................ 454/164 |
| 3,683,783 A | | 8/1972 | Pedrani et al. |
| 4,691,623 A | * | 9/1987 | Mizusawa .................. 454/164 |
| 4,711,159 A | * | 12/1987 | Armbruster ................ 454/137 |
| 4,781,106 A | * | 11/1988 | Frien ........................ 454/164 |
| 4,879,976 A | * | 11/1989 | Boyesen .................... 123/65 V |
| 5,085,132 A | * | 2/1992 | Ikeda et al. ................ 454/158 |
| 5,105,731 A | | 4/1992 | Kraus et al. |
| 5,167,574 A | * | 12/1992 | Ikeda et al. ................ 454/164 |
| 5,205,781 A | * | 4/1993 | Kanno et al. ............... 454/164 |
| 5,247,912 A | * | 9/1993 | Boyesen et al. ............ 123/65 V |

(Continued)

FOREIGN PATENT DOCUMENTS

GB          2129119          5/1984

(Continued)

*Primary Examiner*—Steven B McAllister
*Assistant Examiner*—Patrick F. O'Reilly, III
(74) *Attorney, Agent, or Firm*—Gifford, Krass, Sprinkle, Anderson & Citkowski, P.C.

(57) ABSTRACT

An air duct assembly for a vehicle heating, ventilation and air conditioning (HVAC) system includes a first duct member having a pair of opposed side walls, an upper wall and a lower wall, a front wall, a rear wall and a central passageway. A second duct member is operatively attached to the first duct member, and includes a plurality of integrally formed chambers. Each chamber has a pair of opposed side walls, an upper wall and a lower wall interconnecting the sidewalls, a front wall and a rear wall and a central passageway extending between an opening in the front wall and an opening in the upper wall. A door member is disposed between the first duct member and the second duct member. The door member includes a plurality of flaps that control the flow of air through the second duct member and the first duct member.

8 Claims, 2 Drawing Sheets

U.S. PATENT DOCUMENTS

| | | | |
|---|---|---|---|
| 5,492,505 A * | 2/1996 | Bell et al. | 454/162 |
| 5,601,117 A * | 2/1997 | Lewis et al. | 137/855 |
| 5,759,097 A * | 6/1998 | Bernoville et al. | 454/162 |
| 5,779,536 A | 7/1998 | McCorkel et al. | |
| 5,823,870 A * | 10/1998 | Emerling et al. | 454/162 |
| 6,210,266 B1 * | 4/2001 | Barton | 454/162 |
| 6,468,148 B1 * | 10/2002 | Furusawa et al. | 454/164 |
| 6,780,098 B2 | 8/2004 | Nishida et al. | |
| 2004/0253566 A1 * | 12/2004 | Quinn et al. | 434/162 |

FOREIGN PATENT DOCUMENTS

| | | | |
|---|---|---|---|
| JP | 57196031 | | 12/1982 |
| JP | 58183308 A | * | 10/1983 |
| JP | 60169320 | | 9/1985 |
| JP | 61143648 | | 7/1986 |
| JP | 62190351 | | 8/1987 |
| JP | 63220036 | | 9/1988 |
| JP | 04110540 A | * | 4/1992 |
| JP | 05149614 | | 6/1993 |
| JP | 06058616 | | 3/1994 |
| JP | 2005075020 A | * | 3/2005 |

* cited by examiner

AIR DUCT ASSEMBLY FOR A VEHICLE

CROSS-REFERENCE TO RELATED APPLICATIONS

This application claims priority of U.S. Provisional Patent Application Ser. No. 60/765,969 filed Feb. 7, 2006, which is incorporated herein by reference.

FIELD OF THE INVENTION

The present invention relates generally to a ventilation system for a vehicle, and more specifically to an air duct for a ventilation system on a vehicle.

BACKGROUND OF THE INVENTION

Vehicles, such as automobiles, include a climate control system for maintaining the interior climate of the occupant compartment of the vehicle. Air handling for the climate control system is provided by a heating, ventilation and air conditioning (HVAC) assembly. The HVAC assembly includes a network of ducts and vents for transferring a flow of air in through and out of the vehicle. The airflow in the occupant compartment enhances occupant comfort, provides for anti-fogging of windows, as well as other features. The transfer of fresh air into the occupant compartment and of stale air out of the occupant compartment is typically accomplished via an interconnected system of air vents and air ducts. The air duct openings are positioned in various locations in the occupant compartment, such as in the instrument panel, a pillar, or the quarter panel, or the like.

One function of an air duct is to provide for the controlled flow of air into the occupant compartment of the vehicle. Another function of an air duct is to provide for the controlled flow of air out of the occupant compartment of the vehicle. The air duct may have other functions as well, and may be part of an integrated air duct assembly. Various considerations influence the configuration of the air duct. For example, a consideration is to maintain an effective transfer of airflow both in and out of the vehicle for operation of the HVAC system. Another example is to keep transfer of noise or vibration through the air ducts to a minimum. Still another example is to minimize the flow of dust and water through the air ducts and into the vehicle. While presently available air ducts work well, there is still a need in the art for an air duct assembly that improves the performance of the HVAC system by increasing the effective airflow through the occupant compartment of a vehicle while also reducing any side effect concerns of water, dust, or noise intrusion into the occupant compartment.

SUMMARY OF THE INVENTION

Accordingly, the present invention is an air duct assembly for the heating, venting and air conditioning system on a vehicle. The air duct assembly includes a first duct member having a pair of opposed side walls, an upper wall and a lower wall interconnecting the sidewalls, a front wall having an opening and a rear wall having an opening and a central passageway extending between the opening in the front wall and the opening in the rear wall. A second duct member is operatively attached to the first duct member, and includes a plurality of integrally formed chambers. Each chamber has a pair of opposed side walls, an upper wall and a lower wall interconnecting the sidewalls, a front wall and a rear wall and a central passageway extending between an opening in the front wall and an opening in the upper wall. A door member is disposed between the first duct member and the second duct member. The door member is generally planar and includes a plurality of integrally formed flaps corresponding to the opening in the front wall of each chamber of the second duct member, to control the flow of air between the second duct member and the first duct member.

One advantage of the present invention is that an improved air duct assembly for the heating, venting and air conditioning (HVAC) system on a vehicle is provided that increases the effective airflow through the vehicle to improve performance of the HVAC system. Another advantage of the present invention is that the improved air duct assembly reduces the transmission of noise and vibration through the vents. Still another advantage of the present invention is that the improved air duct assembly protects against dust or water intrusion into the vehicle occupant compartment through the vents. A further advantage of the present invention is that the improved air duct assembly more reliably closes a door in the air duct. Still a further advantage of the present invention is that the improved air duct assembly reduces air turbulence within the duct.

Other features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
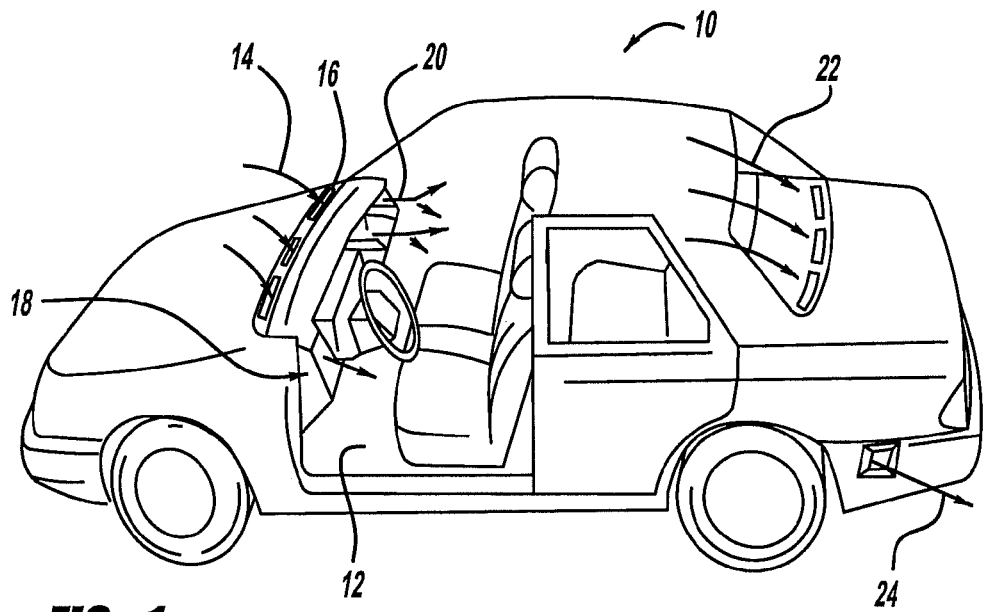
FIG. 1 is a diagrammatic view illustrating airflow through an occupant compartment of a vehicle, according to the present invention.

Referring to FIG. 1, the flow of fresh air into the occupant compartment 12 of a vehicle 10 and the flow of stale air out of the occupant compartment 12 is illustrated. As shown at 14, fresh air enters the vehicle 10 through a vehicle inlet air opening 16. In this example, the vehicle inlet air opening 16 is located in the hood, adjacent the lower edge of the windshield, although other locations are contemplated. The air passes through a series of ducts, vents and air handlers associated with the vehicle heating, ventilation and air conditioning (HVAC) system 18. The HVAC system 18 conditions the air according to the predetermined setting of the HVAC system. For example, the HVAC system 18 may increase the temperature of the air, or lower the temperature of the air or dehumidify the air, or the like. The conditioned air is transferred through the HVAC system 18 and enters into the occupant compartment 12 of the vehicle through vents, as shown at 20. The vent may be an integrally formed louver in a trim panel member. The configuration of the louver may provide a more complicated pathway for the airflow. The conditioned air flows through the occupant compartment 12 in a predetermined manner, and exits the occupant compartment via another vent, as shown at 22. In this example, the vent 22 is positioned at the rear of the vehicle, although other locations are available. The air flows through the ducts and exits the vehicle via a vehicle outlet air opening, as shown at 24. In this example, the vehicle outlet air opening 24 is located in a rear quarter panel of the vehicle, although other locations are available.

The effective airflow through the vehicle 10 is controlled in a predetermined manner. For example, the effective vehicle air outflow area may be referred to as $F_o$. The total outflow of air may be referred to as $F_t$, which is the sum of the vehicle outflow area $F_o$ and the effective area of leakage in the vehicle, $F_l$. Air can leak through various components in the occupant compartment, such as through doors, windows, handles or the like. It should be appreciated that $F_l$ in a modern vehicle is variable, and dependent on factors such as build quality or the like. Control of outlet area $F_o$ is utilized to adjust vehicle interior pressure, to ensure correct airflow volume within the vehicle interior. Further, outlet area $F_o$ is dependent on the path taken by the airflow to reach the vent, and the outlet path influences noise and vibration performance, as well as dust intrusion. Further, the vent area can be adjusted to meet a predetermined $F_o$ target value. In addition, the total flap or vent door area can be estimated by using a ratio of the total flap area $F_t$ divided by the flow output $F_o$, as compared to the total flap area $F_t$ divided by the target flow output $F_o$.

Figure 2:
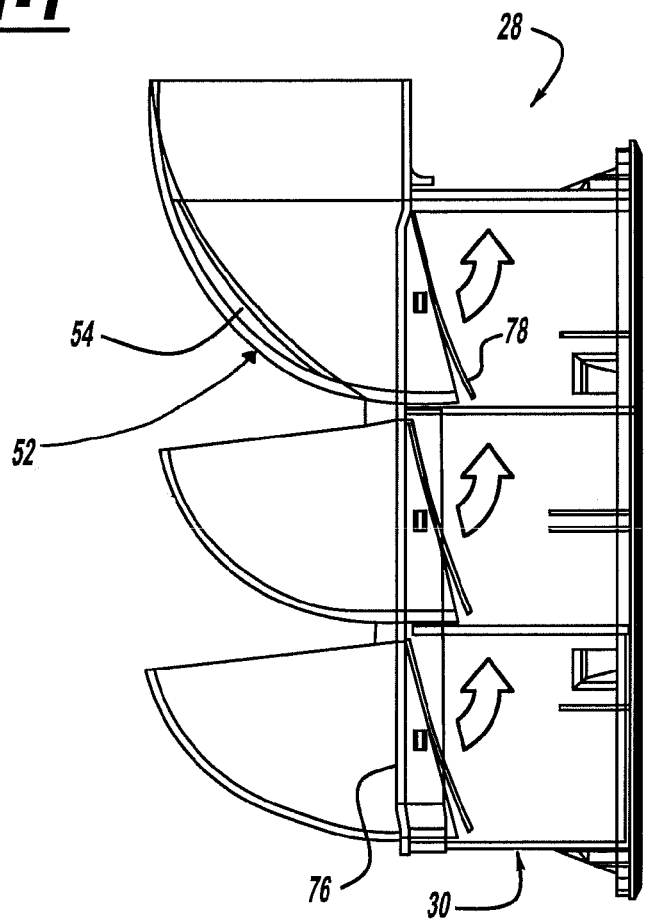
FIG. 2 is a side view of an outlet air duct assembly located in a quarter panel of the occupant compartment of a vehicle, according to the present invention.
Figure 3:
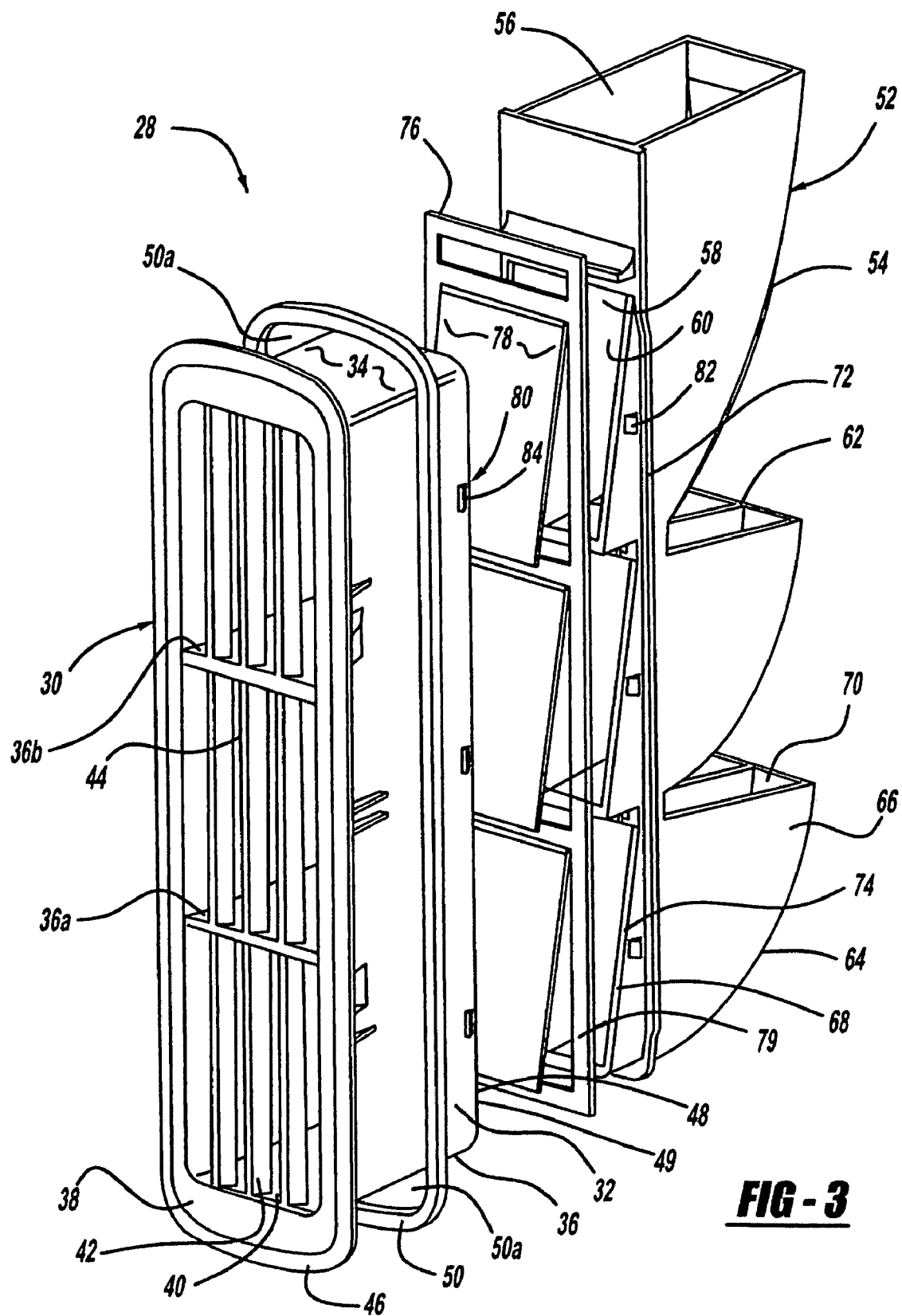
FIG. 3 is an exploded view of the air duct assembly of FIG. 2, according to the present invention.

Referring to FIGS. 2-3, an air duct assembly is illustrated. In this example, the air duct assembly 28 is an outlet air duct. The air duct assembly 28 advantageously controls the intrusion of water or dust or the like through the duct. The air duct assembly 28 of the present invention includes a first duct member 30. The first duct member 30 includes a pair of opposed side walls 32, and an upper wall 34 and a lower wall 36 interconnecting the sidewalls to form a chamber having a central passageway 44. The first duct member 30 may include a plurality of lower walls as shown at 36a and 36b, to form separate chambers each having a central passageway 44. The first duct member also includes a front wall 38 extending between a front edge of each of the sidewalls 32, and a front edge of the upper wall 34 and the lower wall 36. The front wall is a generally planar member, and includes a plurality of openings. It should be appreciated that in this example, the front wall includes a plurality of louvers 42 and openings 40 that provide access to the central passageway 44 formed in the first duct member 30. The front wall 38 also includes a flange portion 46 extending outwardly a predetermined distance beyond the sidewall 32. The first duct member also includes a rear wall 48 extending between a rear edge of each of the sidewalls 32, a rear edge of the upper wall 34 and the lower wall 36. The rear wall 48 includes an opening 49 that is continuous with the central passageway 44.

The air duct assembly 28 includes a seal casket 50 located adjacent a rear surface of the flange portion 46 of the first duct member front wall 38. The seal gasket 50 is generally planar, and includes a centrally located opening 50a enabling the seal gasket 50 to fit around the sidewalls of the first duct member 30. In this example, the shape of the seal gasket 50 corresponds to the shape of the front wall flange portion 46. It should be appreciated that the shape and thickness of the seal gasket 50 may be modified, depending on the desired qualities, such as sealing characteristics. The seal gasket 50 may be fabricated from a compressible material, such as foam or rubber or the like, although other materials may be utilized.

The air duct assembly 28 also includes a second duct member 52 having a plurality of integrally connected chambers 54. It should be appreciated that the second duct member may operatively be in communication with other ducts. Each chamber has a corresponding inlet opening 56 and outlet opening 58 and passageway 60 extending therebetween. Further, each chamber 54 includes an upper wall 62 and a lower wall 64, and a pair of opposed side walls 66 interconnecting the upper wall and lower wall 64. Each chamber 54 also includes a front wall 68 and a rear wall 70. The front wall 68 includes the outlet opening 58, and the upper wall 62 includes the inlet opening 56 that is continuous with a central passageway 60 through the chamber 54. The inlet opening 56 forms an inlet for receiving air into the duct assembly. The outlet opening 58 in each of the front walls 68 forms an outlet opening for the airflow from the duct assembly. In this example there are three chambers. It should be appreciated that each chamber front wall may be inclined at a predetermined angle as shown at 74, in order to direct the flow of air in a predetermined manner.

The second duct member 52 further includes a flange portion 72 extending outwardly from the side walls 66. In this example, the flange portion is spaced a predetermined distance from the edge of the front wall 68 and provides a support surface for receiving a door gasket 76.

The door gasket 76 is positioned adjacent the front wall 68 of the second duct member 52, and controls the flow of air through the air duct assembly. The door gasket 76 is generally planar, and includes a plurality of integrally formed flaps 78, and a frame portion 79 surrounding the flaps 78. The number of flaps 78 corresponds with the number of chambers 54 in the second duct member 52 and the shape of the flaps 78 corresponds to the shape of the opening in the front wall 68 of each chamber 54. In this example there are three flaps 78. Each flap 78 forms a door controlling access to the passageway 60 in the second duct member 52. The door gasket 76 is made from a pliable material, such as rubber, or plastic or the like. The rubber flaps 78 prevent dust intrusion and wind noise through the air duct assembly 28. In addition the flaps 78 prevent water intrusion through the duct assembly 28 and into the vehicle. The flap collects any water that may intrude and directs the flow of water away from the opening in the first duct member 30.

The door gasket 76 is positioned adjacent the second duct member flange 72. Each flap 78 in the door gasket forms a door controlling access into the corresponding chamber 54. The seal gasket 50 is positioned adjacent the first duct flange 46. The first duct member 30 is operatively connected to the second duct member 52 by a connecting means 80. An example of a connecting means 80 may be a plurality of integrally formed tabs 82 that are secured within a corresponding slot 84. In this example, the sidewalls of the second duct member 52 includes a plurality of outwardly extending tabs 82, and the sidewalls 32 of the first duct member 30 includes a plurality of corresponding slots 84 for a snap-fit engagement of the first duct member 30 with the second duct member 52. It should be appreciated that in this example the inclined portion of the front wall 68 of the second duct member 52 is disposed within the central passageway formed in the first duct member 30, to provide a secure connection and prevent the leakage of air from the joined members. In addition, the passageway in each second duct member chamber is in communication with each passageway formed in the first duct member chamber.

The air duct assembly 28 may be installed in a suitable location in the vehicle, such as in a pillar or a panel portion of the vehicle. Typically, the air duct assembly 28 is inserted in an opening that is associated with an HVAC system duct. A trim member may hold the air duct assembly 28 in place. The arrangement of the openings in the air duct assembly 28 facilitates the airflow. Improved performance of opening and shutting the door flap and the transfer of the air pressure is achieved due to the free flow of air through the chambers. Further, the gasket 50 and flaps 78 of the present invention alleviate harsh noise and vibrations. In addition, a sound-absorbing material such as foam may be utilized within a body structure to absorb or block the transmission of a noise into the occupant compartment.

In operation, air flows into the second duct member 52 through each of the inlet openings 56 in each chamber 54, and flows through each passageway 60 in each chamber 54. The subsequent air pressure against the flap 78 in the door gasket opens the flap covering the front wall opening, thus allowing the airflow to enter the central passageway 44 in the first duct member 30 through the opening in the rear wall 48. The air passes through the central passageway 44 in the first duct member 30 and exits the opening 40 formed in the front wall 38 of the first duct member 30. It should be appreciated that the airflow through the air duct assembly 28 may be reversed, and the air duct assembly would function in a similar manner. It should be appreciated that the air duct assembly 28 may include other features known in the art, such as a gasket positioned to reduce noise or vibration, or the like.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

The invention claimed is:

1. An integral air duct assembly for use with a heating, ventilation and air conditioning (HVAC) system on a vehicle comprising:

a first duct member having a plurality of separate chambers, with each of the chambers having a pair of opposed side walls, an upper wall and a lower wall interconnecting the sidewalls, a front wall having an outlet opening and a rear wall having an inlet opening and a central passageway extending between the outlet opening in the front wall and the inlet opening in the rear wall for directing a flow of air from the inlet opening in the rear wall to the outlet opening in the front wall;

a second duct member operatively attached to the first duct member, wherein the second duct member includes a plurality of chambers, with each of the separate chambers having a pair of opposed side walls, an upper wall and a lower wall interconnecting the sidewalls, a front wall and a rear wall defining a corresponding central passageway extending between an inlet opening in the upper wall and an outlet opening in the front wall of each of the separate chambers of the second duct member, for directing the flow of air through the corresponding central passageway extending between the inlet opening and the outlet opening of each of the separate chambers, the separate chambers of the second duct member linked with a corresponding separate chamber in the first duct member; and a door member disposed between the first duct member and the second duct member, wherein the door member is generally planar and includes a plurality of integrally formed flaps, and each flap covers the corresponding outlet opening for each of the separate chambers of the second duct member and the corresponding chambers of the first duct member, to control the flow of air in through the second duct member and out of the first duct member.

2. The air duct assembly of claim 1 further comprising a gasket adapted to be received between the first duct member and the second duct member.

3. The air duct assembly of claim 2 wherein said gasket is made from a rubber material.

4. The air duct assembly of claim 1 wherein the front wall of the first duct member includes a flange portion that extends outwardly beyond the side wall.

5. The air duct assembly of claim 1 wherein the second duct member includes three separate chambers and the door member includes three flaps that each form a door controlling access to each of the separate chambers in the second door member.

6. The air duct assembly of claim 1 further comprising a connecting mechanism for securing the first duct member to the second door member.

7. The air duct assembly of claim 6 wherein said connecting mechanism includes a tab projecting from the second duct member that is in snap-fit engagement with a slot in the side wall of the first duct member.

8. The air duct assembly of claim 1 wherein each flap prevents intrusion of water between the second duct member and the first duct member.

* * * * *

UNITED STATES PATENT AND TRADEMARK OFFICE
CERTIFICATE OF CORRECTION

PATENT NO. : 7,517,280 B2
APPLICATION NO. : 11/671108
DATED : April 14, 2009
INVENTOR(S) : Robert A. McConnell et al.

It is certified that error appears in the above-identified patent and that said Letters Patent is hereby corrected as shown below:

Column 3, line 45 replace "casket" with --gasket--

Column 6, line 2 replace "upper" with --front--

Column 6, line 2 replace "front" with --upper--

Signed and Sealed this

Twenty-eighth Day of July, 2009

JOHN DOLL
*Acting Director of the United States Patent and Trademark Office*